(12) United States Patent
Okamoto et al.

(10) Patent No.: US 7,069,860 B2
(45) Date of Patent: Jul. 4, 2006

(54) IGNITER FOR AIR BAG SYSTEM

(75) Inventors: Mitsuyasu Okamoto, Himeji (JP); Shingo Oda, Himeji (JP)

(73) Assignee: Daicel Chemical Industries, LTD, Osaka (JP)

( * ) Notice: Subject to any disclaimer, the term of this patent is extended or adjusted under 35 U.S.C. 154(b) by 0 days.

(21) Appl. No.: 10/886,679

(22) Filed: Jul. 9, 2004

(65) Prior Publication Data
US 2004/0260743 A1 Dec. 23, 2004

Related U.S. Application Data

(62) Division of application No. 10/350,097, filed on Jan. 24, 2003, now Pat. No. 6,820,557.

(60) Provisional application No. 60/360,020, filed on Feb. 28, 2002.

(30) Foreign Application Priority Data

Jan. 25, 2002 (JP) .............................. 2002-016326
Feb. 15, 2002 (JP) .............................. 2002-038681

(51) Int. Cl.
*F23Q 21/00* (2006.01)
(52) U.S. Cl. ..................... 102/218; 102/206; 280/735
(58) Field of Classification Search ................ 102/206, 102/218, 219, 530; 280/728.1, 734, 735
See application file for complete search history.

(56) References Cited

U.S. PATENT DOCUMENTS 6,418,853 B1    7/2002   Duguet et al.

FOREIGN PATENT DOCUMENTS

| JP | 2707250 B2 | 10/1997 |
|---|---|---|
| JP | 2000-241098 A | 9/2000 |
| JP | 2000-513799 A | 10/2000 |
| JP | 2001-171475 A | 6/2001 |
| WO | 98/36949 A1 | 8/1998 |
| WO | 00/43727 A1 | 7/2000 |

*Primary Examiner*—T Nguyen
(74) *Attorney, Agent, or Firm*—Birch, Stewart, Kolasch & Birch, LLP

(57) ABSTRACT

A method of activating at least one electrical igniter incorporated in each of a plurality of gas generators provided in an air bag system is provided. The method includes: connecting an electronic control unit to a power source and an impact detecting sensor; providing a bus line having a plurality of loop wires passing through the electronic control unit to supply and transmit current and required information; connecting each of the at least one electrical igniter to the electronic control unit through the bus line branched from predetermined portions of the bus line; providing each of the at least one electrical igniter with a heat generating portion, a priming ignited by the heat generating portion, a capacitor, and an integrated circuit recorded with information to exhibit required functions; and supplying a current for igniting the priming to the at least one igniter through the capacitor.

31 Claims, 14 Drawing Sheets

IGNITER FOR AIR BAG SYSTEM

CROSS REFERENCE TO RELATED APPLICATIONS

This application is a Divisional of application Ser. No. 10/350,097, filed on Jan. 24, 2003, now U.S. Pat. No. 6,820,557 and for which priority is claimed under 35 U.S.C. § 120; and this application claims priority under 35 U.S.C. § 119(e) of U.S. Provisional Application No. 60/360,020 filed on Feb. 28, 2002 and under 35 U.S.C. § 119(a) of Application Nos. 2002-16326 and 2002-38681 filed in Japan on Jan. 25, 2002 and Feb. 5, 2002; the entire contents of all are hereby incorporated by reference.

BACKGROUND OF THE INVENTION

1. Field of the Invention

The present invention relates to an igniter for an air bag system utilizing a bus system, and a method for controlling an operation of an air bag system using the same.

2. Description of Related Art

An airbag system for protecting a passenger from an impact at the time of a vehicle collision is indispensable, and the air bag system needs to be lighter because of a demand for lighter vehicles. Recently, types and the total number of air bags, such as an air bag for a driver side, a passenger side, rear seats, and a side impact mounted on a single vehicle are increasing. Therefore, there are increased demands for lighter air bag systems.

In a conventional air bag system, an electronic control unit (ECU), connected to a power source (a battery in a vehicle), and an impact detecting sensor are individually connected to each gas generator (a gas generator and an air bag are accommodated in a module case). An aspect of the connection between the ECU and the individual gas generators is shown in FIG. 13.

As shown in FIG. 13, the ECU and an igniter (shown in FIG. 14) provided in each gas generator are necessarily connected to each other through two conductors. Therefore, twice as many conductors than the number of igniters are required. Having many conductors contributes largely to a weight increase in the air bag system. In view of constraints at the time of assembling vehicle parts, the ECU and the individual gas generators are connected not only by the conductors but also via a plurality of connectors. Accordingly, a serious problem such as a weight increase due to the use of the connectors and a cost increase due to the increased number of the connectors occurs. Further, an increase in volume (weight) of the ECU due to an increase in volume of a capacitor incorporated in the ECU as a backup power source for activating all the igniters (serving at the time of a disconnection between the power source and the ECU) is another serious problem.

In view of the above, a trial for reducing the weight of the conductors by utilizing a bus system in the air bag system has been examined.

Incidentally, JP2000-241098A, JP2000-513799A, and Japanese Patent No. 2707250 disclose art that utilize the bus system.

SUMMARY OF THE INVENTION

The present invention provides a method of activating at least one electrical igniter incorporated in a gas generator in an air bag system, the method including: connecting an electronic control unit to a power source and an impact detecting sensor; providing a bus line having a plurality of loop wires passing through the electronic control unit to supply and transmit current and required information; connecting the at least one electrical igniter to the electronic control unit through the bus line branched from predetermined portions of the bus line; providing each electrical igniter with a heat generating portion, a priming ignited by the heat generating portion, a capacitor, and an integrated circuit recorded with information to exhibit required functions; and supplying the current for igniting the priming in the electrical igniter through the capacitor.

In this embodiment, the current is supplied at a relatively high electric current for a relatively short time, namely, the current is supplied such that the width of the ignition pulse is 20 to 500 μsec, preferably 30 to 200 μsec, and more preferably 40 to 100 μsec. As a result, since the amount of ignition energy required for activating individual igniters can be reduced, the amount of ignition energy required for all the igniters, namely for the entire air bag system can be reduced. For this reason, the capacitance of the capacitor for the backup power source incorporated in the ECU can be made smaller, and accordingly, the ECU can be reduced in size.

DETAILED DESCRIPTION OF EMBODIMENTS OF THE INVENTION

An air bag system of the present invention achieves reduction in weight of the entire system by using a bus line and achieves reliability of an operation of the system by the above-described solving means. Embodiments including the above-described first to seventh solving means will be explained below. In this case, the order of the solving means and the order of embodiments do not coincide with each other necessarily.

(1) First Embodiment

Figure 1:
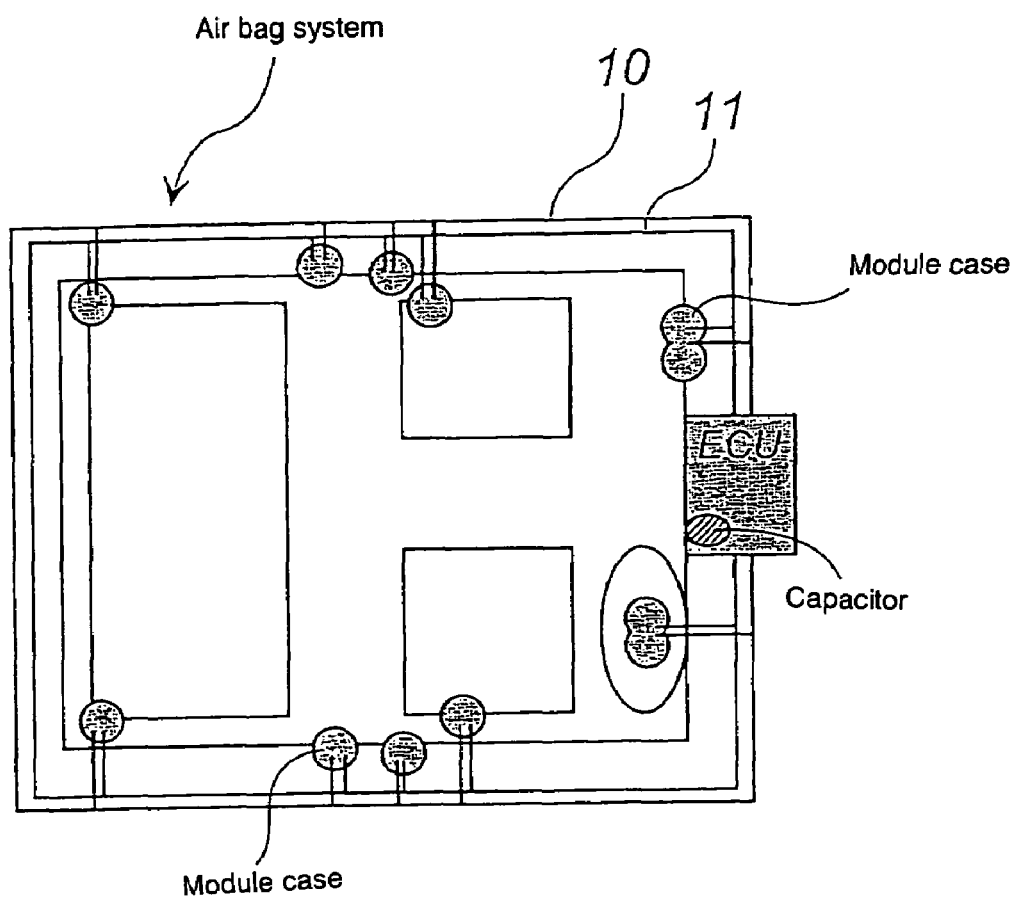
FIG. 1 is a diagram of an air bag system employing an igniter for an air bag system of the present invention.
Figure 13:
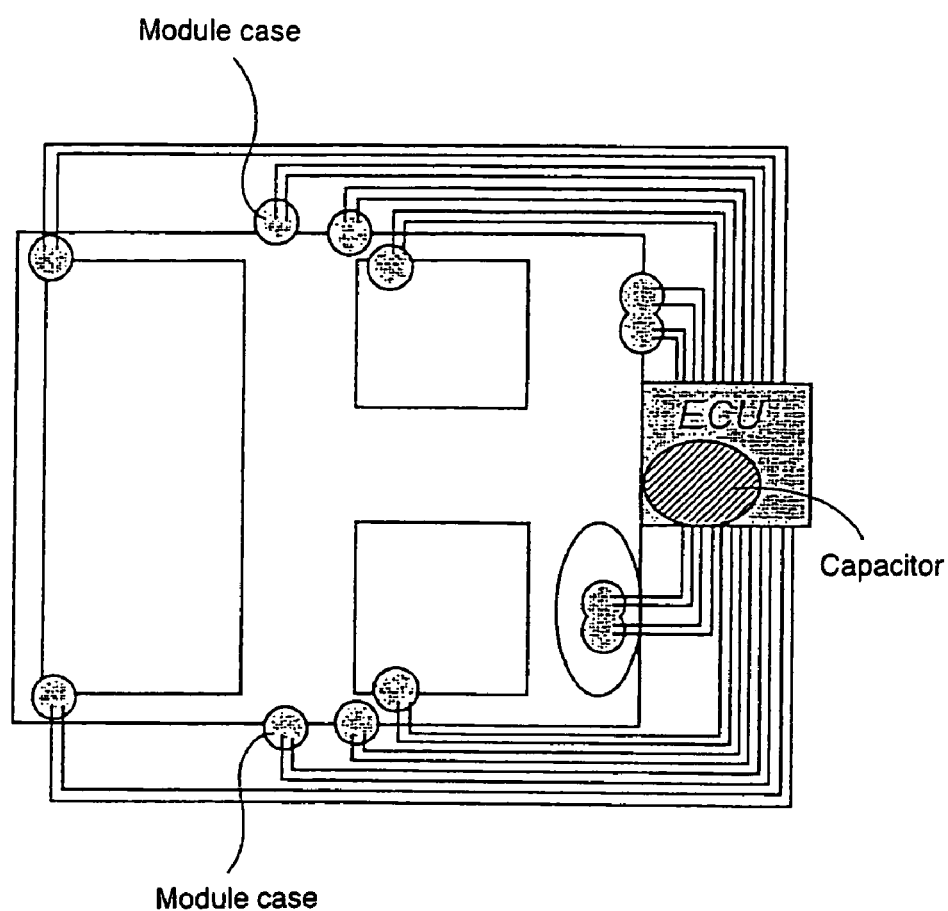
FIG. 13 is a diagram of a conventional air bag system.
Figure 14:
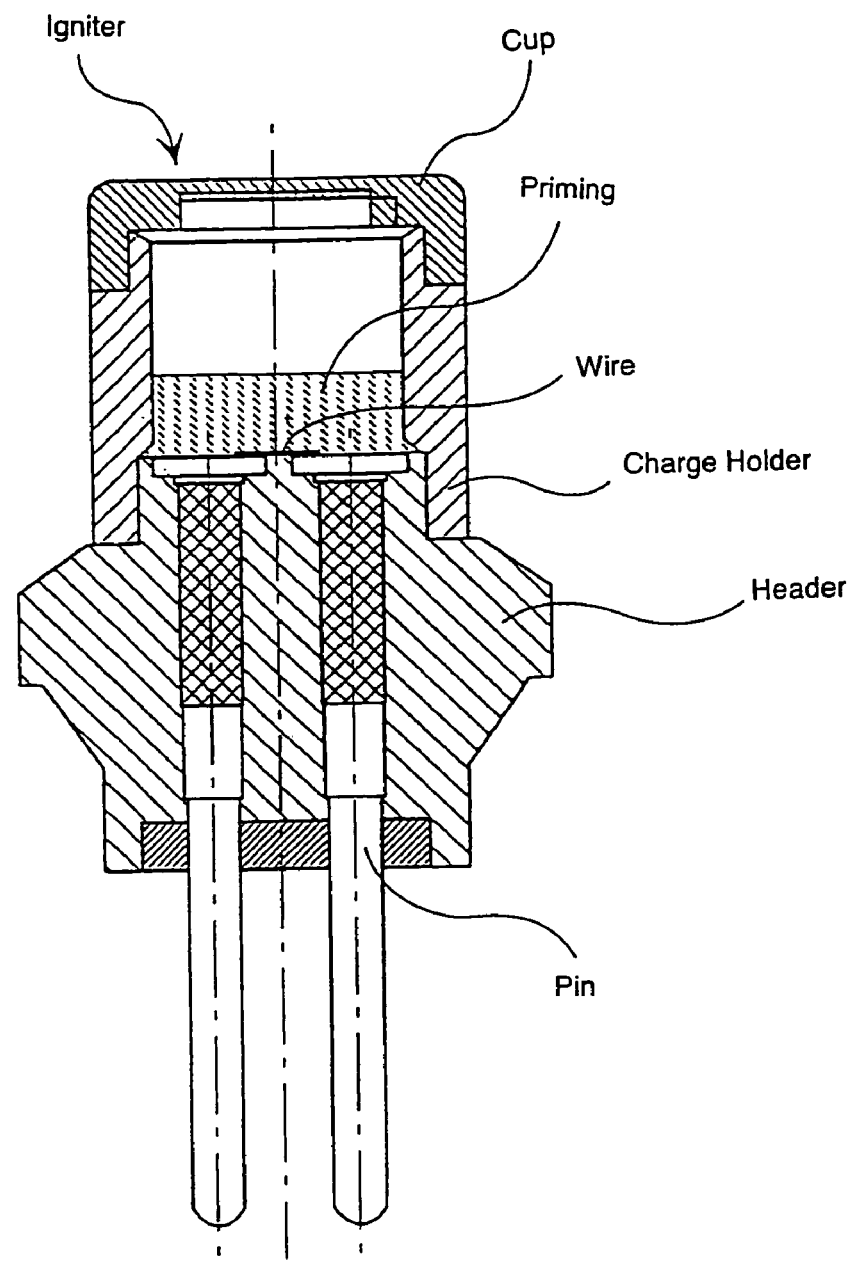
FIG. 14 is a vertical sectional view of an igniter used in the conventional air bag system.

As shown in FIG. 1, an air bag system utilizing an igniter according to the present invention includes bus lines 10 and 11 comprising two loop wires connected to an ECU. The ECU is connected to a power source (a battery in a vehicle) and an impact detecting sensor (not illustrated). In the ECU, a capacitor as a backup power source, which provides power to the bus lines 10 and 11 when a conductor connecting the ECU and the power source is disconnected by an impact during a vehicle collision, is disposed. Incidentally, in the air bag system of the present embodiment, since a capacitor is disposed in each gas generator or each igniter, the backup capacitor may have a small capacitance (i.e., light weight). By contrast, a backup capacitor in the conventional air bag system shown in FIG. 13 must have a capacitance large enough to activate all the gas generators when a lead wire between the battery and the ECU is disconnected.

A required number of gas generators, each provided in a module case, (indicted by black circles in FIG. 1) are connected to the bus lines 10 and 11, such that they are actuated by two conductors (or three or more conductors if necessary).

Figure 2:
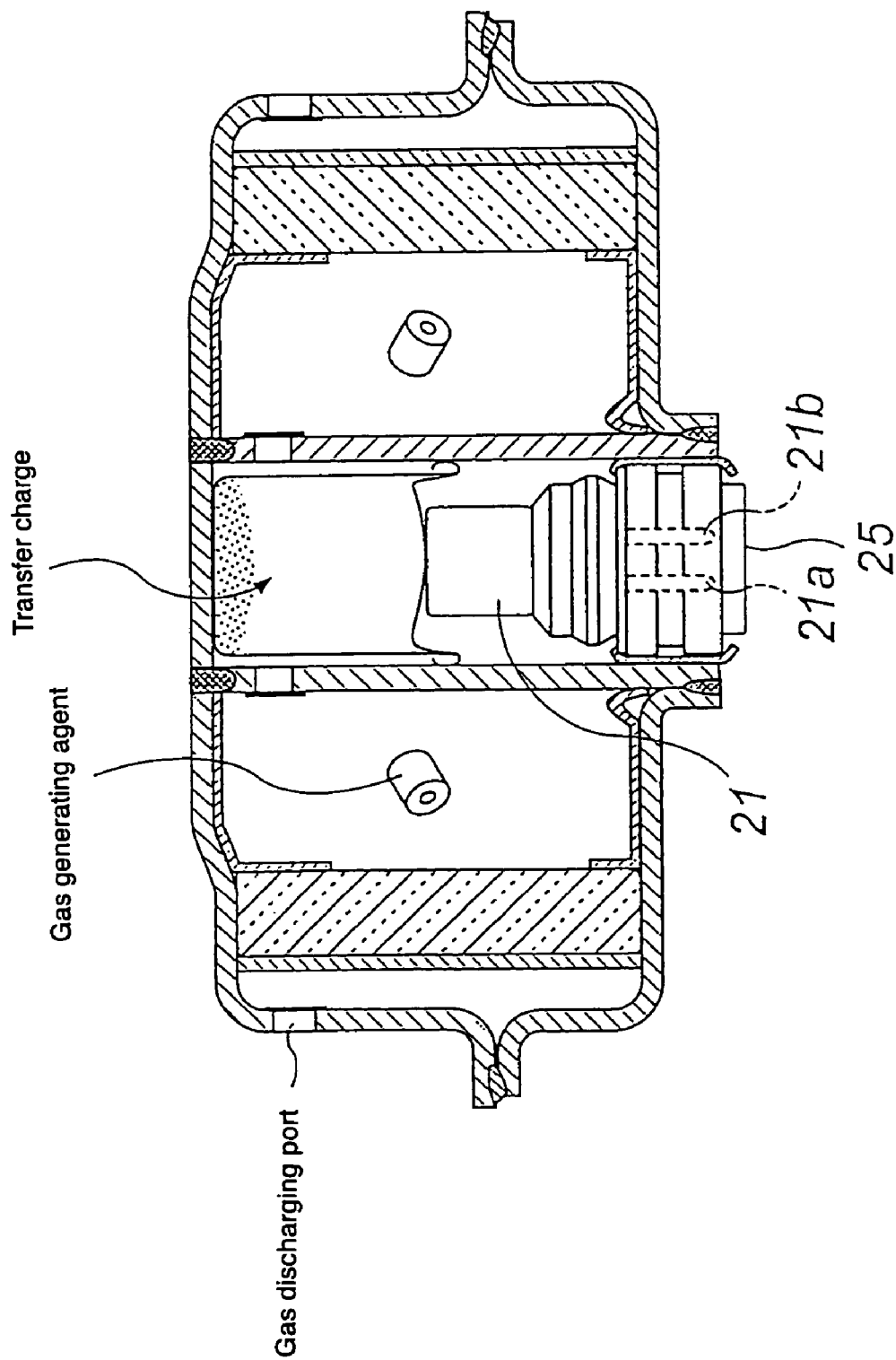
FIG. 2 is an axial sectional view of a gas generator including an igniter (including one igniter) for an air bag system of the present invention.
Figure 3:
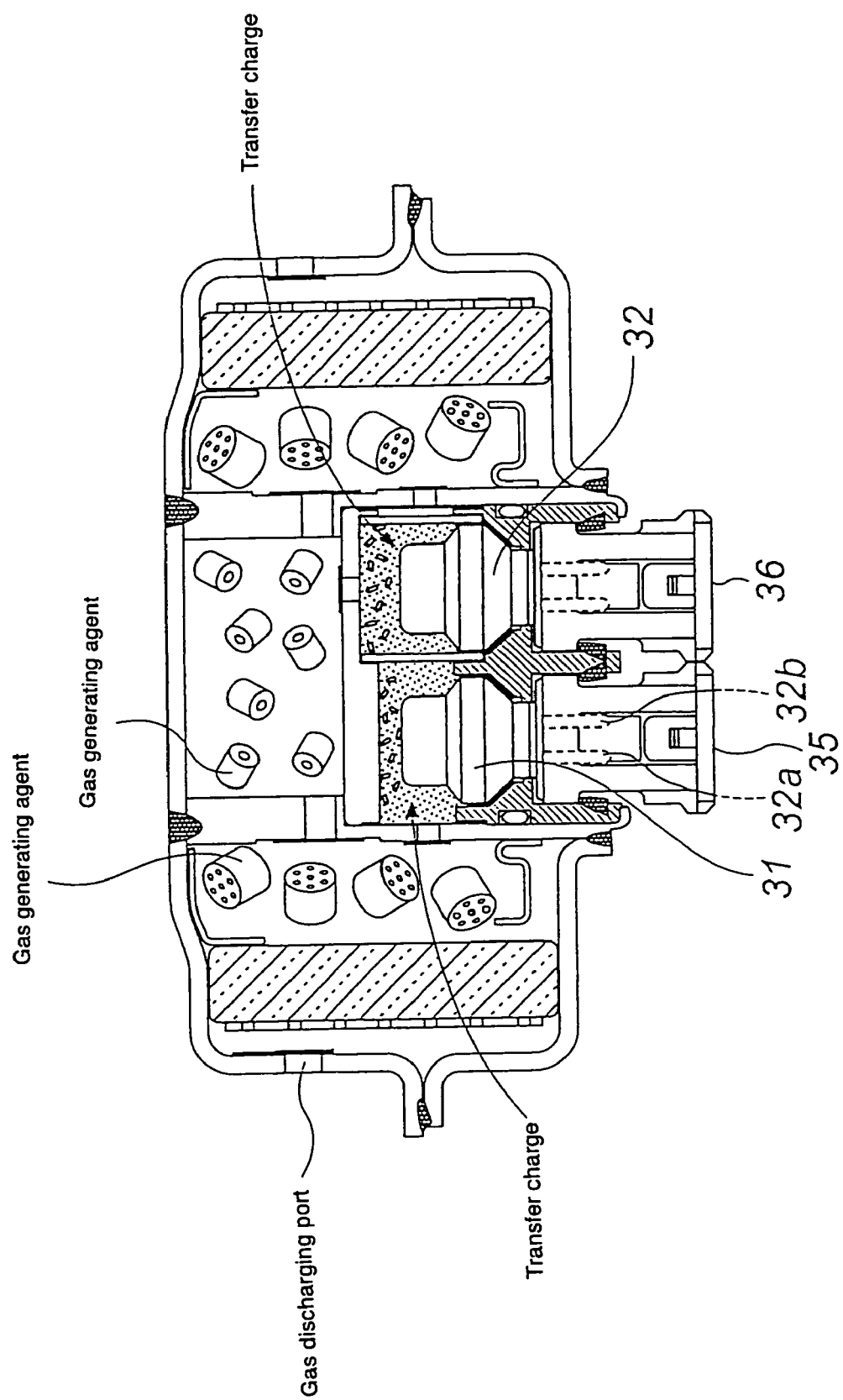
FIG. 3 is an axial sectional view of a gas generator including an igniter (including two igniters) for an air bag system of the present invention.

A gas generator shown, for example, in FIG. 2 or FIG. 3 can be used in the air bag system of the present embodiment. FIG. 2 is a cross-sectional view of a single type gas generator in which a single igniter 21 is provided, and FIG. 3 is a cross-sectional view of a dual type gas generator in which two igniters 31 and 32 are provided.

In the single type gas generator, two pins 21a and 21b (but not limited to two) are provided in the igniter 21 and they are connected to the bus lines 10 and 11 through a connector 25.

In the dual type gas generator, two pins 31a and 31b (but not limited to two) are provided in the igniter 31, two pins 32a and 32b (but not limited to two) are provided in the igniter 32, and the igniters 31 and 32 are connected to the bus lines 10 and 11, respectively, through connectors 35 and 36.

Figure 4:
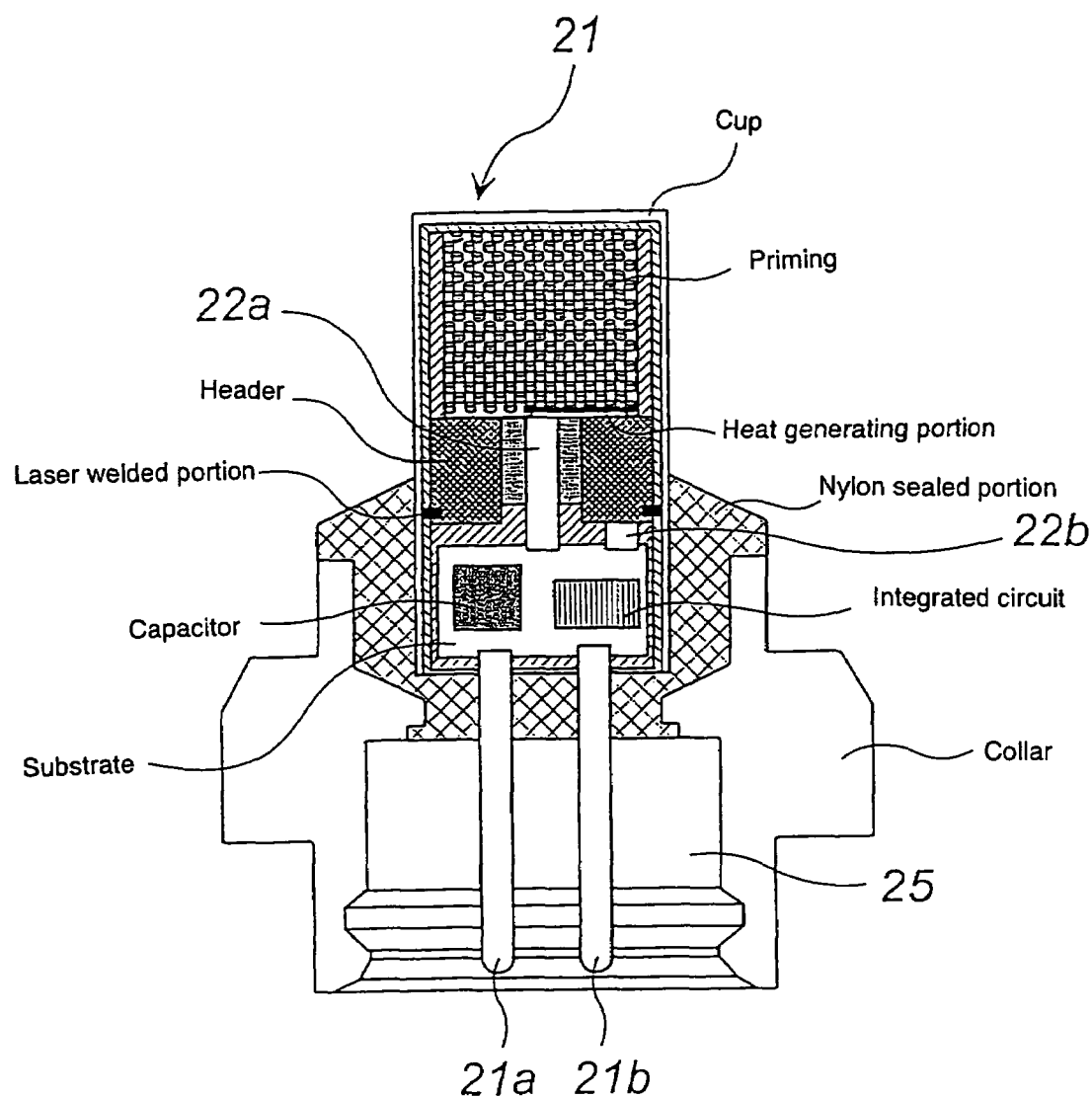
FIG. 4 is a vertical sectional view of an igniter for an air bag system of the present invention.

As the igniter 21 and the igniters 31 and 32 shown in FIG. 2 and FIG. 3, for example, an igniter shown in FIG. 4 can be used. FIG. 4 shows a vertical schematic cross-sectional view of the igniter. The structure of the igniter 21 will be described below by referring to FIG. 4.

The igniter 21 has a heat generating portion provided on a glass header, a priming (for example, ZPP) charged to come in pressure-contact with the heat generating portion, and a substrate provided with a capacitor and an integrated circuit which stores information required for deploying the air bag, disposed in a lower portion of the igniter 21. The integrated circuit, and the heat generating portion and the capacitor are respectively connected by two conductors, and the integrated circuit is further connected to the pins 21a and 21b through other conductors.

The integrated circuit stores information for inflating a required air bag when a command is received from the ECU at least upon a vehicle collision. In addition, information required, for example, for detecting abnormality of the heat generating portion of the igniter, a function for identifying each of the plural gas generators, and a function for detecting a malfunction of the capacitor can be stored in the integrated circuit.

Figure 5:
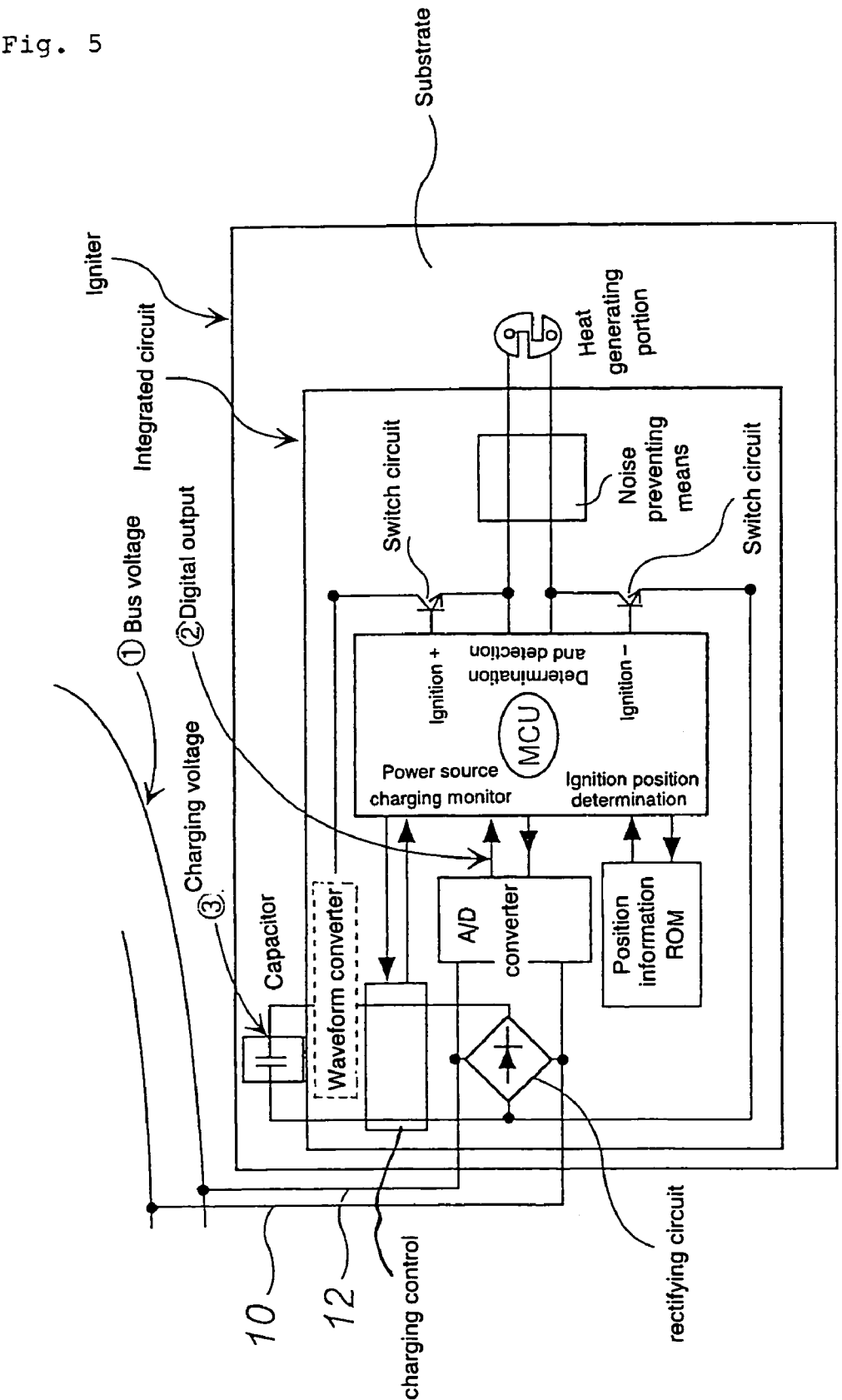
FIG. 5 is a conceptual diagram of an igniter for an air bag system of the present invention.
Figure 6:
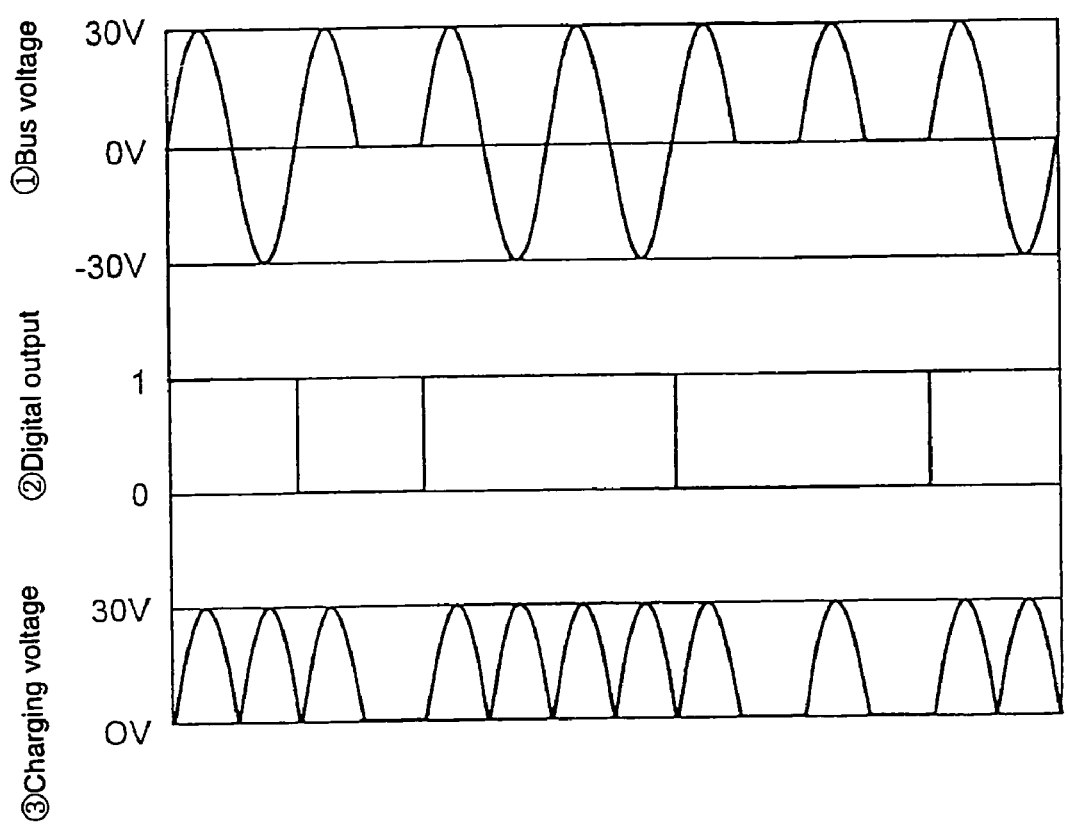
FIG. 6 is a pulse waveform diagram of a bus voltage, a digital output and a charging voltage shown in FIG. 5.

The substrate in the igniter, as shown in FIG. 4, provided with the capacitor or the integrated circuit may be constituted as shown in FIG. 5. Incidentally, FIG. 6 shows pulse waveforms of a bus voltage, a digital output, and a charging voltage shown in FIG. 5.

The capacitor and the integrated circuit are provided on the substrate, and a discharging waveform converting circuit (shown as a "waveform converter" by a broken line) can also be provided, if required. The discharging waveform converting circuit can be incorporated into the integrated circuit. An electric current for charging the capacitor is provided via a rectifying circuit.

The integrated circuit and the capacitor provided on the substrate are connected to the bus lines 10 and 11 through the pins 21a and 21b. After a current and information supplied from the bus lines 10 and 11 are sent to the integrated circuit, they are converted to digital signal outputs by an A/D converter (an analog/digital converter) to be sent to an MCU (a Micro Computer Unit). Thereafter, a command is sent from the MCU such that charge control information, position identification information, disconnection information of the heat generating portion or a resistance value change information is exhibited. The current is also used for charging the capacitor as stated above, but not for making the heat generating portion generate heat.

A varistor (a non-linear resistance element) is disposed in the integrated circuit between the MCU and the heat generating portion as noise preventing means, which prevents the igniter from activating erroneously due to a noise generated outside the igniter.

The heat generating portion is in contact with the priming, and it generates heat by a current supplied only from the capacitor to ignite the priming.

Next, an operation of the air bag system according to this embodiment and a method of controlling an operation of the air bag system will be explained with reference to FIG. 1, FIG. 5, and the like.

When a vehicle is running normally, the ECU sends the disconnection information or the resistance value change information of the heat generating portion, information indicative of a malfunction of the capacitor, and information as to whether or not an igniter including an identifying function for activating a gas generator (information as to whether or not an igniter having the identification function for activating a required gas generator at the time of a collision is disposed correctly, or whether or not another igniter having the same identifying function is disposed in a duplicated manner) to the integrated circuit arranged in the igniter through the bus lines 10, 11 so that whether or not there is abnormality in these members is checked. When there is an abnormality, an alarm lamp is activated, so that an early exchange of parts can be conducted to recover the safety. Further, the capacitor in each igniter can be charged by the power source.

When the vehicle provided with the airbag system collides, information from the impact detecting sensor is sent to the ECU, and information from the ECU is sent, via the bus lines 10 and 11, to a gas generator (that includes the igniter having the integrated circuit) required to inflate an air bag for ensuring a safety for a vehicle occupant.

Upon receiving this information, a required current is supplied from the capacitor for a predetermined time period (from the point where a current value reaches the current value corresponding to 5% of the maximum current value to the point where it is reduced to 5% of the maximum current value which is within 500 μsec), and the heat generating portion generates heat to ignite and burn the priming. At this time, the waveform of the current forms a discharging waveform represented by the formula (I) when a discharging starts at a time t=0. By igniting and burning the priming, a transfer charge in FIG. 2 or FIG. 3 and further the gas generating agents are ignited and burnt to generate a gas. The gas is discharged from gas discharging ports to inflate an air bag accommodated in the module case together with the gas generator.

In a conventional air bag system, since a current for activating an igniter flows from a power source (a battery) with a relatively large capacitance at 1.2 A for about 2 msec, that is, at a relatively low current for a relatively long period of time, a waveform of an ignition current (a current value (A) v. a time (μsec)) becomes rectangular.

In this embodiment, however, since a current for activating an igniter is supplied from a capacitor with a relatively small capacitance, it is preferable that a relatively high electric current flows for a short period of time, because ignition of the igniter is made smoother and ignition energy itself can be made smaller. The waveform of the ignition current at this time becomes a discharging waveform expressed by the following formula (I) when discharging starts at a time of time t=0:

$$i(t) = (V0/R) \times e^{-t/CR} \qquad (I)$$

(In the formula, V0 represents a capacitor charging voltage (V), R represents a circuit resistance (Ω), C represents a capacitor capacitance (μF), t represents a time (μsec), and i represents a current (A)).

When such a discharging waveform expressed by the formula (I) is employed, a current value becomes larger than the conventional rectangular waveform, but a current conduction time is shortened. Therefore, the ignition energy is reduced largely.

In the present embodiment, when a period in which a stable current supply is being maintained after reaching a desired current value is defined as t (μsec) and a period from the start of an increase in the current to a stopping of the current for making the heat generating portion generate heat is defined as T (μsec), it is preferable that a relationship (t/T) between t and T is in the range of 0≦t/T<0.2 or 0.5<t/T<1.

In the case of 0≦t/T<0.2, a waveform of the current is similar to a discharging waveform (a waveform similar to a triangle) obtained when electricity stored in the capacitor is applied to the heat generating portion directly. In the case of 0.5<t/T<1, the waveform is similar to that obtained when a discharging waveform is converted through a discharging waveform converting circuit (hereinafter, abbreviated as "a waveform converting circuit") for converting a waveform of the current stored in a capacitor to a signal waveform of the current for igniting the priming or the like.

The period for supplying the current in the above manner is preferably within 200 μsec, and more preferably within 100 μsec. Incidentally, a current value at this time varies depending on a resistance value of the heat generating portion in the igniter, and it is determined on the basis of the presence or absence of the waveform converting circuit, the constitution of the waveform converting circuit, a particle diameter of a priming, the shape of the heat generating portion and the like.

(2) Second Embodiment

An igniter for an air bag system of the second embodiment is characterized in a structure of a substrate on which the integrated circuit and the like is arranged, and a state of the disposition or the like.

First, a structure of a substrate will be explained. As shown in FIG. 5, a capacitor, an integrated circuit that stores information to exhibit required functions, and a heat generating portion are provided on the substrate. These members can be arranged on one surface or both surfaces of the substrate.

Figure 7:
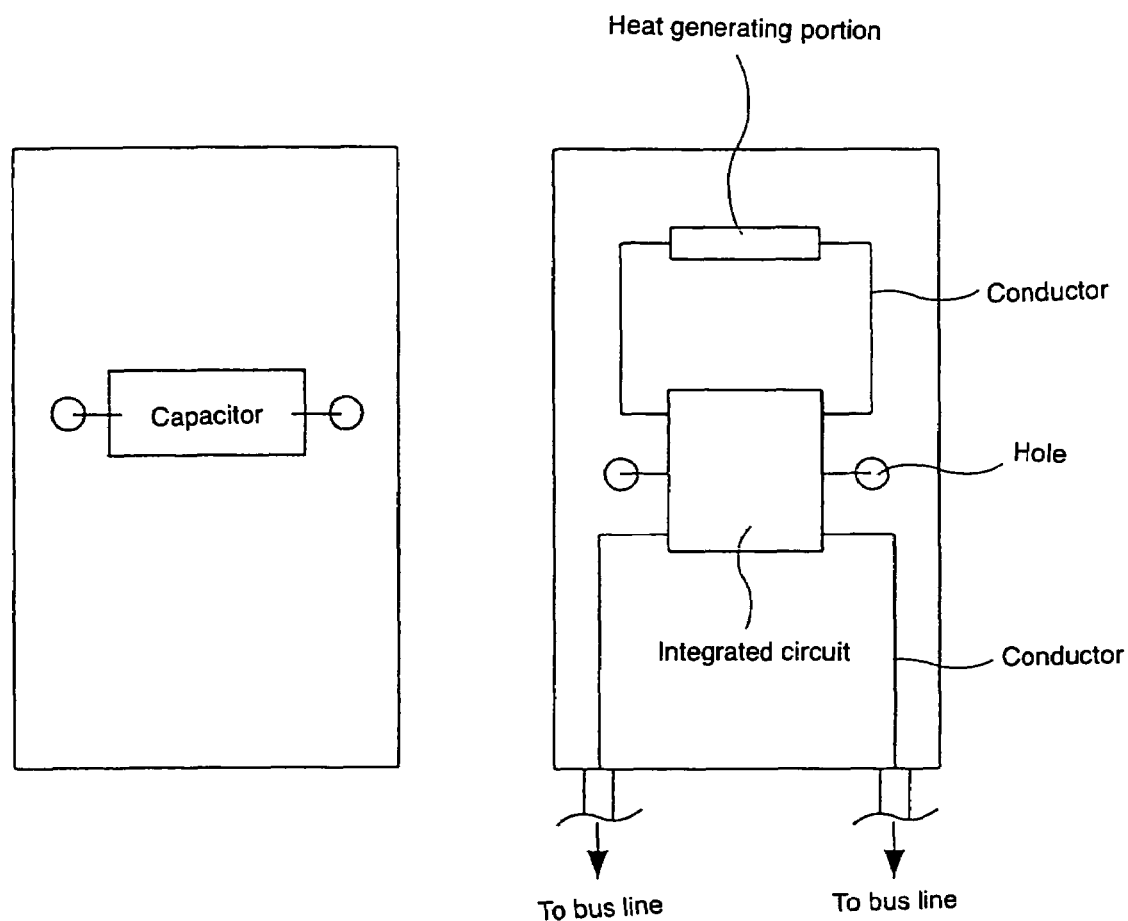
FIG. 7 is a plan view of both surfaces of a substrate (respective elements are arranged on both surfaces) provided in an igniter for an air bag system of the present invention.

As shown in FIG. 7, the integrated circuit and the heat generating portion can be provided on one surface of the substrate, or the capacitor can be provided on the other surface. When this structure is employed, the capacitor and the integrated circuit are connected through two conductors inserted into two holes, and the integrated circuit and the heat generating portion are connected through another set of two conductors. The integrated circuit is also connected to the bus lines 10 and 11 through two conductors, pins of the igniters or the like.

Figure 8:
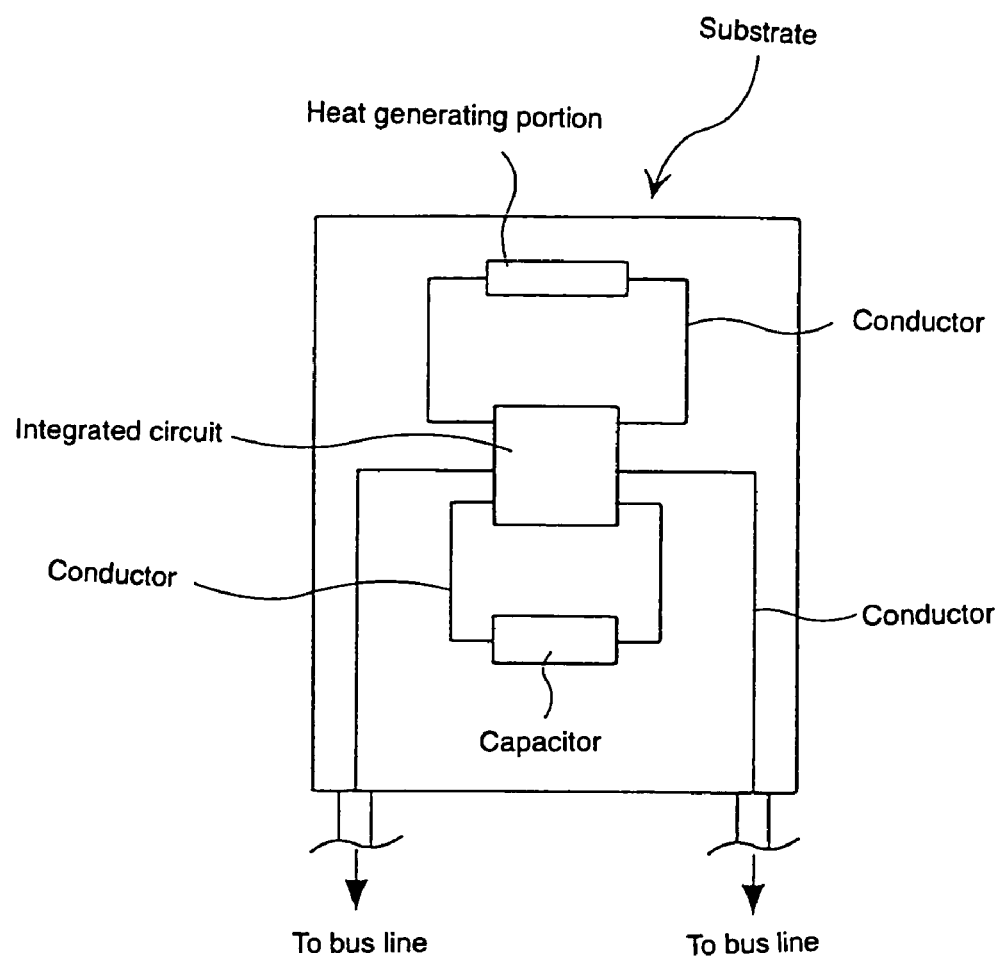
FIG. 8 is a front view of a substrate (respective elements are arranged on one surface) provided in an igniter for an air bag system of the present invention.

As shown in FIG. 8, the heat generating portion and the capacitor can be arranged on one surface of the substrate. The integrated circuit, the capacitor, and the heat generating portion are connected by two conductors respectively, and the integrated circuit is also connected to the bus lines 10 and 11 through another set of two conductors, pins of the igniters or the like.

Figure 9:
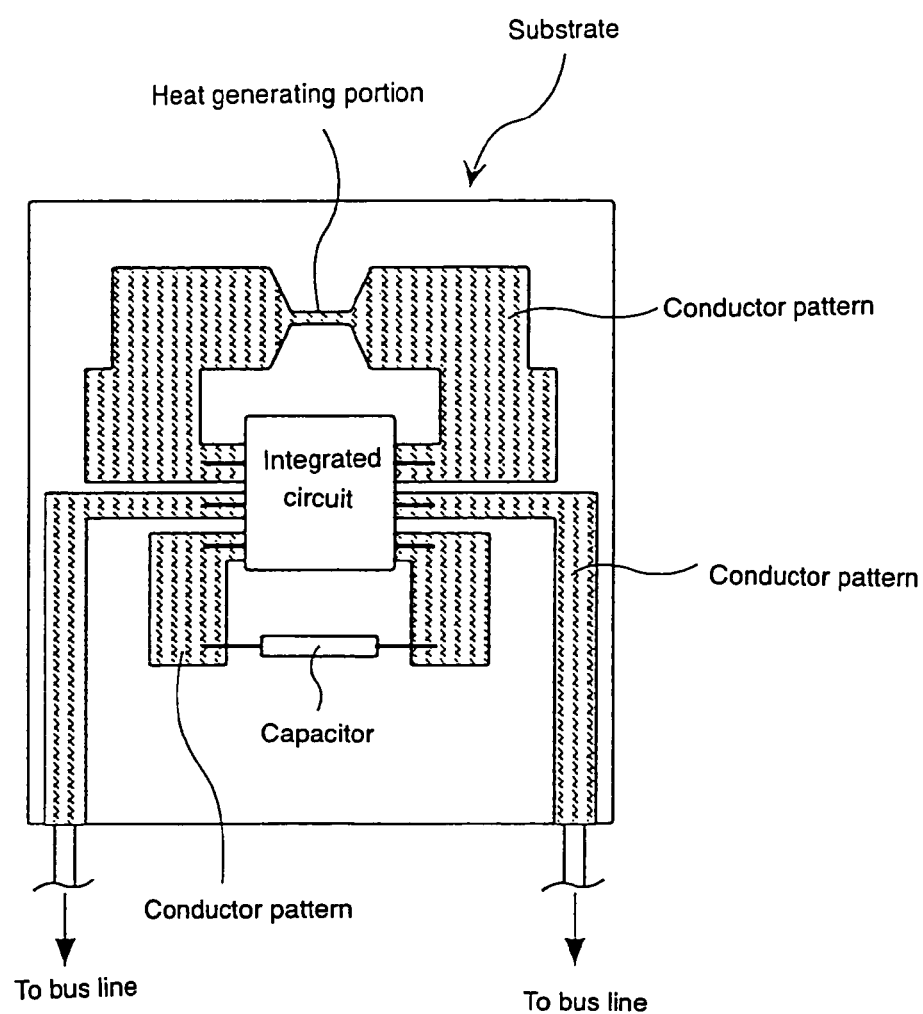
FIG. 9 is a front view of another embodiment of a substrate (respective elements are arranged on one surface) provided in an igniter for an air bag system of the present invention.

An electroconductive pattern is formed on the substrate by etching as shown in FIG. 9, including connecting portions which connect the integrated circuit with the heat generating portion, the capacitor and the bus line, and the heat generating portion, shown in FIG. 7 and FIG. 8. By using a conductor pattern by such etching, connecting respective elements is performed more easily.

Figure 10:
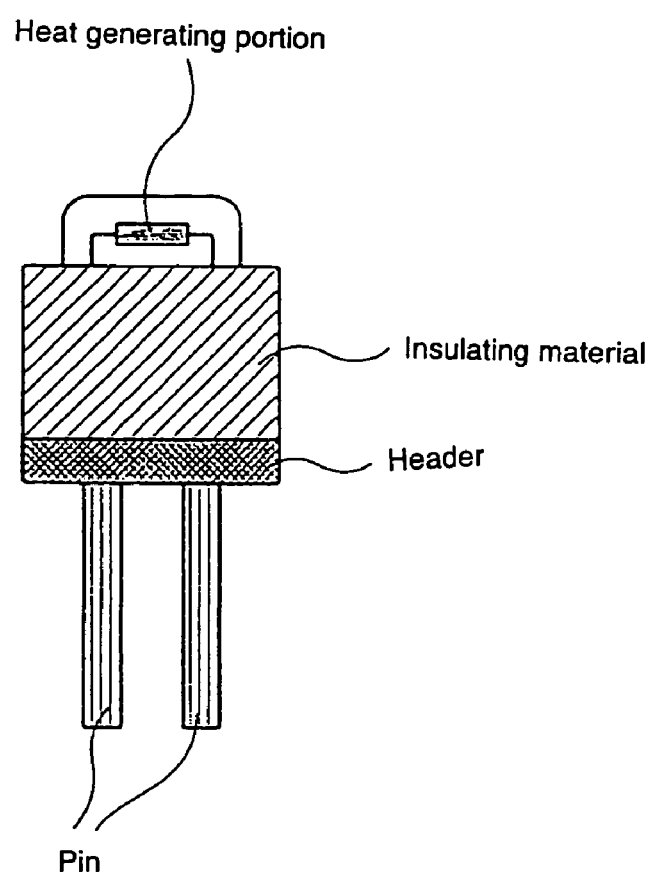
FIG. 10 is a front view of a substrate provided in an igniter for an air bag system of the present invention and sealed with insulating material.

As shown in FIG. 10, when a portion of the substrate except for the heat generating portion is covered and sealed with insulating material such as an epoxy resin, the sealing resin serves as a protection film for the integrated circuit or the capacitor, which is preferable. In FIG. 10, the substrate shown in FIG. 7 is used. The substrate shown in FIG. 9 can be used instead. The substrate is provided to stand on the glass header.

Next, the disposing state of the substrate will be explained with reference to FIG. 11. The substrate shown in FIG. 11 is also shown in FIG. 10, but, in FIG. 10, the priming covering the heat generating portion is removed and the seating portion of the insulating material is partially cut out.

Figure 11:
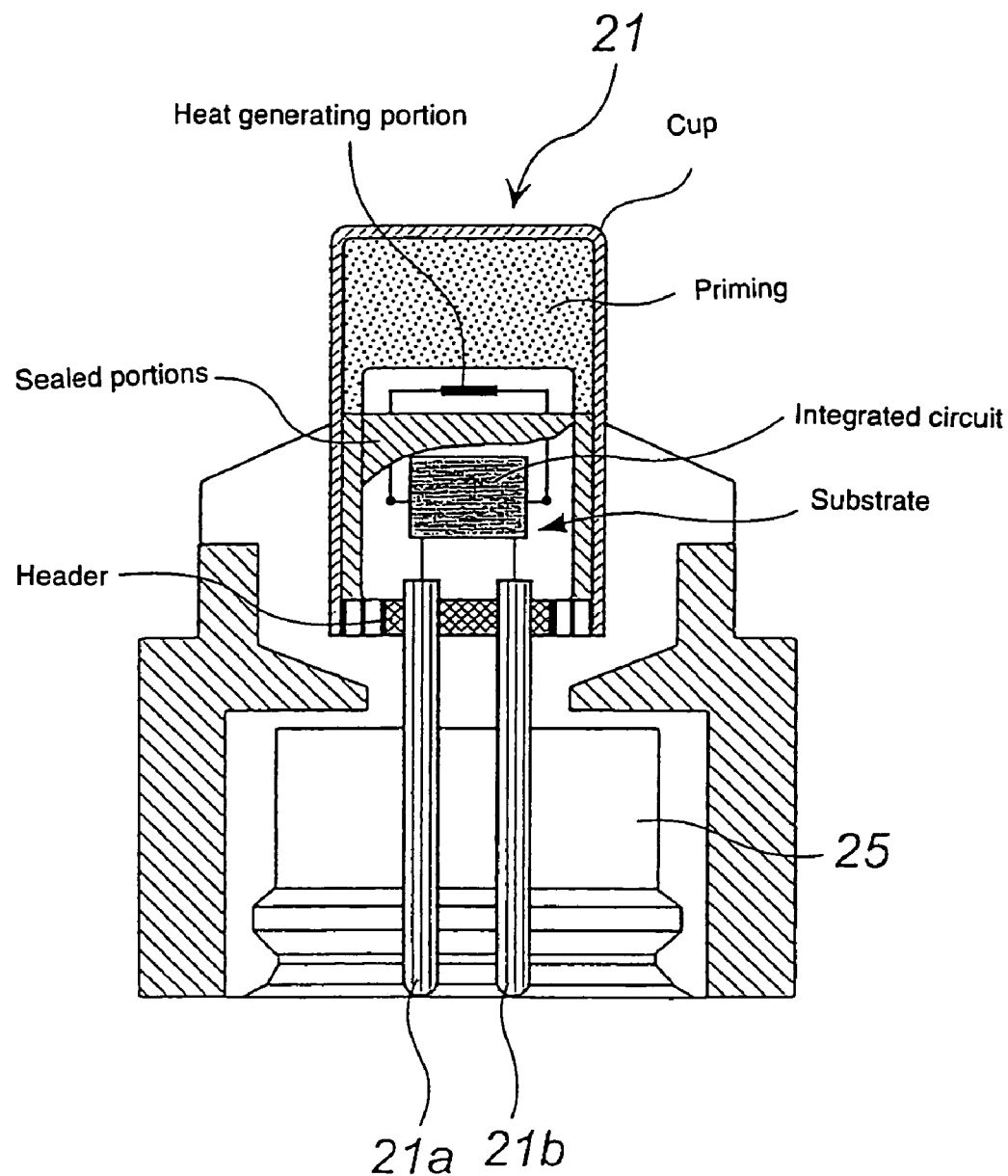
FIG. 11 is a vertical sectional view of another embodiment of an igniter for an air bag system of the present invention.

As shown in FIG. 11, since the substrate shown in FIG. 10 is used as the substrate in the igniter 21 (having a different shape from that shown in FIG. 4), the substrate is provided to stand on the header, a portion of the substrate except for the heat generating portion is covered with an insulating material such as an epoxy resin, and the heat generating portion is in contact with the priming. Contacting surfaces of a substrate bottom surface and the header are fixed by an adhesive.

By providing the substrate on the header vertically in this manner, a space capacity for disposing the substrate can be made smaller than in a case of laying the substrate flat, so that the igniter can be reduced in size. Then, since the integrated circuit and the capacitor on the portion of the substrate except for the heat generating portion do not come in contact with the priming, pollution thereof or the like are prevented.

Further, in the igniter 21 shown in FIG. 4, the glass header for supporting the pins 21a and 21b is provided vertically between the substrate and the priming, and the substrate is provided below the header. The heat generating portion is disposed above the header (on an upper surface of the header), and the heat generating portion and the substrate are connected by conductors (the pins 22a and 22b). The heat generating portion is formed, for example, by welding a wire for heat generation on the header.

In the embodiment shown in FIG. 4, also, the integrated circuit, the capacitor, and the pins 21a and 21b can be connected by a conductor pattern formed by etching, and the heat generating portion and the integrated circuit can be connected by a similar conductor pattern formed by etching.

As described above, by providing the substrate below the header, a space for disposing the substrate can be made smaller than in a case of laying the substrate flat, so that the igniter can be reduce in size. Further, since the substrate and the priming do not come in contact with each other, pollution of the integrated circuit or the capacitor or the like can be prevented.

The air bag system of the second embodiment operates like the air bag system of the first embodiment.

(3) Third to Fifth Embodiments

As shown in FIG. 5, the capacitor, the integrated circuit that stores information to exhibit a function for detecting abnormality of the heat generating portion in the igniter, and the heat generating portion of the igniter are disposed on the substrate. The information includes disconnection of the heat generating portion, a loose contact between the heat generating portion and the priming and the like.

Since abnormality such as disconnection, a loose contact between the heat generating portion, and the priming or the like can be detected rapidly by storing the above information in the integrated circuit, early exchange of parts can be performed to improve reliability of the system and safety of a vehicle occupant.

As shown in FIG. 5, the capacitor, the integrated circuit that stores information that exhibits an function for identifying each of the plural gas generators, and the heat generating portion of the igniter are disposed on the substrate. Preferably, the information to exhibit the above-described identifying function is stored after the gas generator is assembled, after the gas generator is disposed into the module case, or after the module case is mounted in a vehicle.

By storing the above information for identifying the integrated circuit in this manner, storage, transportation or the like of the gas generator can be managed more efficiently, and erroneous activation of the gas generator, such that an air bag is inflated differently from a command from the ECU, is prevented, so that reliability of the system and safety of a vehicle occupant can be improved.

As shown in FIG. 5, the capacitor, the integrated circuit that stores information that exhibits a function for detecting a malfunction of the capacitor and the heat generating portion of the igniter are provided on the substrate. The information includes information for measuring a pulse response or a dielectric dissipation factor.

By storing the above information in the integrated circuit, a malfunction of the capacitor can be detected rapidly, so that prompt exchange of parts can be performed to improve reliability of the system and safety of a vehicle occupant.

In the above-described third to fifth embodiments, the electric current required for exhibiting each stored information is supplied from the power source (a battery in a vehicle) to the integrated circuit via the bus lines 10 and 11 and the two pins 21a and 21b of the igniter 21, and a command for exhibiting the stored information from the ECU is also transmitted to the integrated circuit via the same path as the current. Then, the air bag systems of the third to fifth embodiments operate like the air bag system of the first embodiment.

(4) Sixth Embodiment

Figure 12:
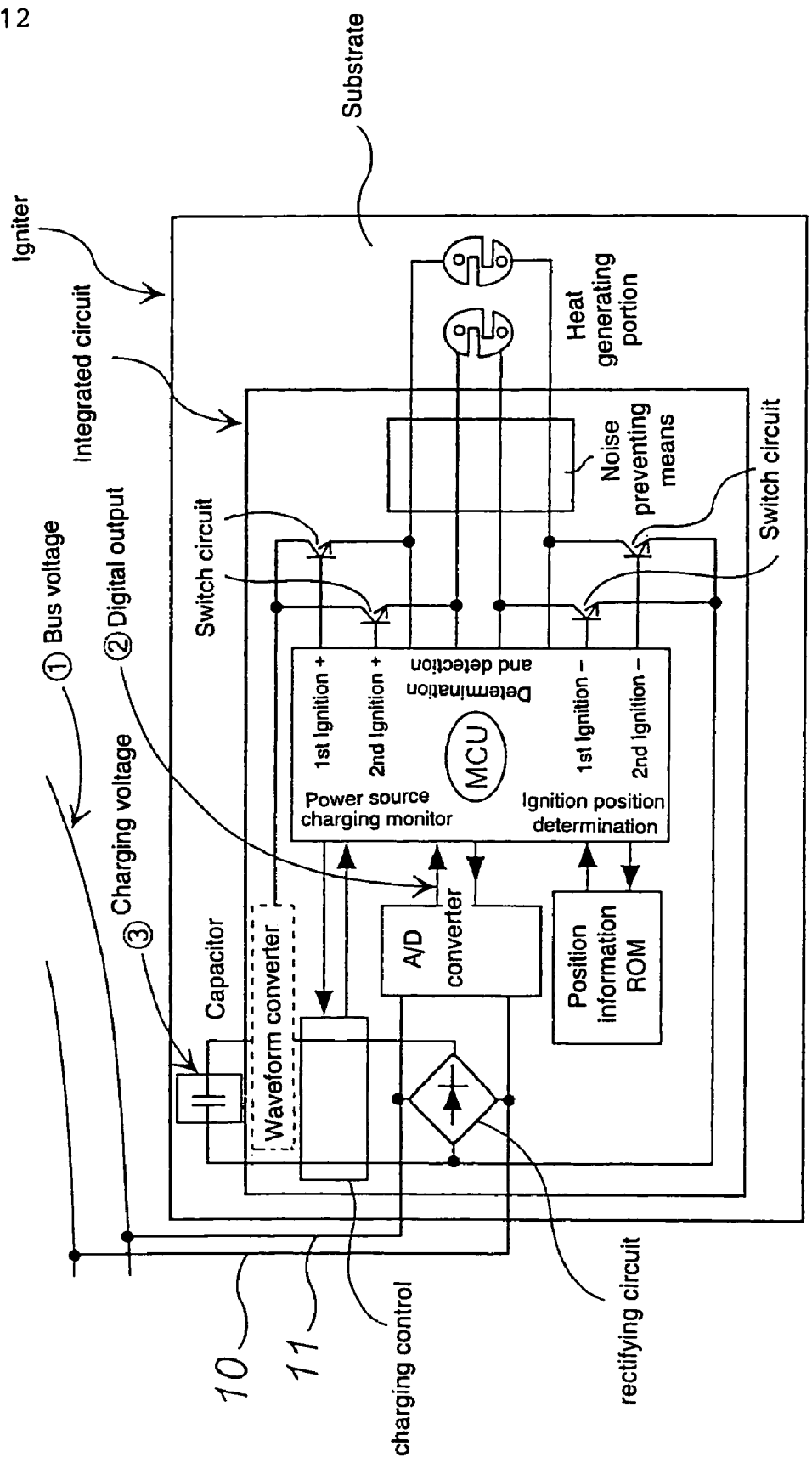
FIG. 12 is a vertical sectional view of another embodiment of an igniter for an air bag system of the present invention.

FIG. 12 shows an integrated circuit for a gas generator having two igniters. The circuit has two heat generating portions that share one capacitor, an integrated circuit that stores information for developing required functions, and a discharging waveform converting circuit provided if required.

The gas generator having two igniters 31, 32, as shown in FIG. 3, can be operated in three modes. A mode where only one of the igniters is activated, a mode where the igniters are activated with a slight time difference, and a mode where both igniters are activated simultaneously. One of the three modes is selected according to a collision state of a vehicle, and the integrated circuit is stored with such information to make one or two heat generating portions generate heat according to each of the above-described three modes.

The igniters 31 and 32 of the gas generator shown in FIG. 3 may have the structures shown in FIG. 5 or FIG. 12.

The air bag system of the sixth embodiment also operates like the air bag system of the first embodiment, and it operates in response to the above-described three command contents.

(5) Seventh Embodiment

A method for controlling an operation of an air bag system in which an integrated circuit for an air bag system of the present invention is incorporated will be explained with reference to FIG. 1 to FIG. 5, and FIG. 12.

When a vehicle is running normally, a weak current for disconnection detection in the heat generating portions is fed from the MCU to the igniters, such that an abnormality in the heat generating portions can be detected. When an abnormality is detected, an alarm lamp or the like is actuated to inform the occupant of the abnormality. Therefore, early exchange of parts can be conducted so that safety can be ensured. Further, an electric current flows from the bus line along with the required information for charging the capacitor.

When the vehicle provided with the air bag system has collided, information from the impact detecting sensor is sent to the ECU, and the integrated circuit further receives the information from the ECU to perform the required functions.

As shown in FIG. 5 (or FIG. 12), a switch circuit (a transistor) for shutting off the electric current when it is unnecessary to actuate the igniter and for starting a current supply at a time of actuation of the igniter is provided in the integrated circuit. When the switch circuit is opened, an electric charge stored in the capacitor does not flow into the heat generating portion.

By feeding a control pulse instructing opening or closing the switch circuit from the MCU, the switch circuit is opened or closed. The instruction of the control pulse transmission to the pulse generator is sent from the MCU upon receiving a command from the impact detecting sensor.

If the switch circuit is applied with, for example, a current pulse having a waveform width of 100 μsec from the MCU, the switch is closed for 100 μsec and it allows a current from the capacitor to flow in the heat generating portion of the igniter as a pulse with a width of 100 μsec. That is, the switch circuit closes a switch while a current (a control pulse) is flowing in the switch circuit like in a case of using a thyristor, a MOS-FET, or a bipolar transistor as the switch circuit. In this manner, by applying a pulse with a predetermined time width (20 to 500 μsec) to the heat generating portion of the igniter, the heat generating portion is caused to generate heat with a required igniting energy to ignite and burn the priming.

In the conventional air bag system, since the current for activating the igniter flows from the power source (a battery) with a capacitance at 1.2 A for abut 2 msec, that is, at a relatively low current for a relatively long time, a waveform of the ignition current (a current value (A) v. time (μsec)) becomes rectangular.

The transfer charge in the gas generator shown in FIG. 2 or FIG. 3, and further the gas generating agent are ignited and burnt by ignition and combustion of the priming to generate a gas, and the generated gas is discharged from the gas discharging port to inflate the air bag accommodated in the module case together with the gas generator.

By using such an integrated circuit in an air bag system, an amount of the current (ignition energy amount) required for actuating individual igniters is reduced, so that an amount of the current required for actuating all the igniters is also reduced. As a result, the capacitance (namely, weight) of the capacitor for the backup power source can also be reduced, and the ECU itself can be made smaller. For this reason, the weight of the entire air bag system can be reduced.

The igniter for an air bag system of the present invention can be applied as an igniter for various inflators (gas generators) such as an inflator for an air bag for a driver side, an inflator for an air bag for a passenger side, an inflator for a side air bag, an inflator for a curtain air bag, an inflator for a knee-bolster air bag, an inflator for an inflatable seat belt, an inflator for a tubular system, and an inflator for a pretensioner.

What is claimed is:

1. A method of activating at least one electrical igniter incorporated in a gas generator in an air bag system, comprising:
    connecting an electronic control unit to a power source and an impact detecting sensor;
    providing a bus line having a plurality of loop wires passing through the electronic control unit to supply and transmit current and required information;
    connecting the at least one electrical igniter to the electronic control unit through the bus line branched from predetermined portions of the bus line;
    providing each electrical igniter with a heat generating portion, a priming ignited by the heat generating portion, a capacitor, and an integrated circuit recorded with information to exhibit required functions; and
    supplying the current for igniting the priming in the electrical igniter through the capacitor.

2. The method of claim 1, wherein the bus line providing step includes providing two loop wires.

3. The method of claim 1, wherein the current supplying step includes supplying the current having a wave form expressed by the following formula (I) when discharging starts at a time of time t=0:

$$i(t)=(V0/R) \times e^{-t/CR} \quad (I)$$

where, v0 represents a capacitor charging voltage (V), R represents a circuit resistance (Ω), C represents capacitance (μF), t represents a time (μsec), and i represents current (A).

4. The method of claim 1, wherein the step of providing each of the at least one electrical igniter includes,
    providing a discharging waveform converting circuit for converting a signal waveform of the current for igniting the priming stored in the capacitor in each electrical igniter.

5. The method of claim 4, wherein the step of providing a discharging waveform converting circuit includes,
    providing the waveform converting circuit in the integrated circuit.

6. A method of activating at least one electrical igniter incorporated in a gas generator provided in an air bag system, comprising:
    connecting an electronic control unit to a power source and an impact detecting sensor;
    providing a bus line having a plurality of loop wires passing through the electronic control unit to supply and transmit current and required information;
    connecting the at least one electrical igniter to the electronic control unit through the bus line branched from predetermined portions of the bus line;
    providing the electrical igniter with a heat generating portion, a priming ignited by the heat generating portion, a capacitor, and an integrated circuit recorded with information to exhibit required functions; and
    providing the capacitor, the integrated circuit, in which information for developing a required function is stored, and the heat generating portion on a substrate provided vertically in the at least one electrical igniter;
    providing the capacitor and the integrated circuit such that at least the capacitor and the integrated circuit is apart from the priming and
    supplying the current for igniting the priming in to the electrical igniter through the capacitor.

7. A method of activating at least one electrical igniter incorporated in a gas generator provided in an air bag system, comprising:
    connecting an electronic control unit to a power source and an impact detecting sensor;
    providing a bus line having a plurality of loop wires passing through the electronic control unit to supply and transmit current and required information;
    connecting the at least one electrical igniter to the electronic control unit through the bus line branched from predetermined portions of the bus line;
    providing the electrical igniter with a heat generating portion, a priming ignited by the heat generating portion, and a capacitor; and
    providing the capacitor and an integrated circuit, in which information for developing a required function is stored, on a substrate provided vertically in each igniter;
    providing a header, which supports an electroconductive member for supplying and transmitting a current between the substrate and the heat generating portion, that vertically separates the substrate and the priming;

providing the substrate below the header and the heat generating portion above the header; and supplying the current for igniting the priming to the electrical igniter through the capacitor.

8. The method according to claim 6 or 7, further comprising:

providing, on the substrate, a discharging waveform converting circuit for converting a signal waveform of a current for igniting the priming.

9. The method of claim 6 or 7, further comprising:

providing the integrated circuit on a first surface of the substrate; and providing the capacitor on a second surface of the substrate.

10. The method of claim 6 or 7, further comprising:

providing the integrated circuit and the capacitor on a same surface of the substrate.

11. The method of claim 6, further comprising:

providing the heat generating portion and the integrated circuit on a same surface of the substrate.

12. The method of claim 6 or 7, further comprising:

fitting the substrate to penetrate a header for forming a priming holding space together with a cup member for holding the priming;

positioning the capacitor and the integrated circuit below the header; and projecting the heat generating portion above the header to come into contact with the priming.

13. The method of claim 6 or 7, further comprising:

sealing a portion of the substrate other than the heat generating portion with an insulating material; and providing the heat generating portion in contact with the priming.

14. The method of any one of claim 1, 6, or 7, further comprising:

recording a function for detecting abnormality of the heat generating portion in the integrated circuit provided for each of the at least one electrical igniter.

15. The method of claim 14, wherein the recording step includes, detecting at least one of disconnection, a loose contact between the heat generating portion and the priming, and an abnormality of a resistance value of the heat generating portion.

16. The method of claim 15, wherein the detecting step includes, detecting a loose contact between the heat generating portion and the priming by detecting a change in a resistance value due to a temperature change of the heat generating portion as a voltage change.

17. The method of any one of claim 1, 6, or 7, further comprising:

recording the function for identifying each of a plurality of gas generators in the integrated circuit.

18. The method of claim 17, further comprising:

recording the information to exhibit a function for identifying each of the plurality of gas generators after assembling the gas generator.

19. The method of claim 17, wherein the recording step includes, recording the information to exhibit a function for identifying each of the plurality of gas generators is recorded after assembling the plurality of gas generators in a module case or after mounting onto a vehicle.

20. The method according to any one of claim 1, 6, or 7, further comprising:

recording a function for detecting a malfunction of the capacitor in the integrated circuit provided in each of the at least one electrical igniter.

21. The method of claim 20, wherein the recording step includes, recording information for measuring a pulse response or a dielectric dissipation factor.

22. The method of any one of claim 1, 6, or 7, further comprising:

providing, inside the electrical igniter, a circuit for preventing the electrical igniter from being activated erroneously by a noise made outside the igniter.

23. The method according to any one of claim 1, 6, or 7, further comprising:

providing at least two electrical igniters, that share one capacitor, in each of a plurality of gas generators;

providing one integrated circuit shared by the at least two electrical igniters, and recorded with the information for exhibiting required functions; and providing one discharging waveform converting circuit shared by the at least two electrical igniters, and for converting a signal waveform of a current for igniting the priming stored in the capacitor.

24. The method according to any one of claim 1, 6, or 7, further comprising:

providing at least two electrical igniters in each of a plurality of gas generators;

providing each electrical igniter with the capacitor and an integrated circuit recorded with information to exhibit required functions, and with two pins for supplying and transmitting the current and required information to at least two electrical igniters from the bus line.

25. The method according to any one of claim 1, 6, or 7, further, comprising:

providing a circuit, among the currents from the bus circuit for charging the capacitor and the required information, for charging the capacitor, in the integrated circuit, the circuit rectifying a current to flow into a capacitor to be charged.

26. The method of claim 25, further comprising:

providing, in the integrated circuit, a unit having a function for amplifying at least one of a rectified voltage for charging the capacitor and a voltage applied to the bus line.

27. The method according to any one of claim 1, 6, or 7, wherein the current supplying step includes, supplying the current from the capacitor to the heat generating portion within 500 μsec, a time period from a point where the current reaches a value corresponding to 5% of a maximum current value to a point where the current is reduced to a value corresponding to 5% of the maximum current value.

28. The method according to claim 27, wherein the current supplying step includes, discharging a waveform expressed by the following formula (I) when discharging starts at a time of time t=0:

$$i(t)=(V0/R)\times e-t/CR \qquad (I)$$

where in the formula, v0 represents a capacitor charging voltage (V), R represents a circuit resistance (Ω), C represents a capacitor capacitance (μF), t represents a time (μsec), and i represents a current (A).

29. The method according to claim 27, wherein the current supplying step includes, supplying the current such that when a period in which a stable current supplying is being maintained after reaching a desired current value is defined as t (μsec) and a period from a start of waveform rising to stopping of the current supplying for making the heat generating portion generate a heat is defined as T (μsec), t and T (t/T) satisfies $0 \leq t/T < 0.2$ or $0.5 < t/T < 1$.

30. The method according to any one of claim 1, 6, or 7, wherein the current supplying step includes, supplying the current to the heat generating portion as an ignition pulse, and such that a width of the ignition pulse becomes 20 to 500 μsec.

31. The method according to claim 30, wherein current supplying step includes, setting the width of the ignition pulse to 40 to 100 μsec.

* * * * *